United States Patent
Brunner et al.

(10) Patent No.: US 9,116,001 B2
(45) Date of Patent: Aug. 25, 2015

(54) ADAPTIVE ESTIMATION OF FRAME TIME STAMP LATENCY

(75) Inventors: Christopher Brunner, San Diego, CA (US); Mahesh Ramachandran, San Diego, CA (US); Arvind Ramanandan, San Diego, CA (US); Murali Ramaswamy Chari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 567 days.

(21) Appl. No.: 13/523,638

(22) Filed: Jun. 14, 2012

(65) Prior Publication Data

US 2013/0335554 A1    Dec. 19, 2013

(51) Int. Cl.
*G01C 21/16*    (2006.01)
*H04N 17/00*    (2006.01)
*H04N 5/232*    (2006.01)

(52) U.S. Cl.
CPC .............. *G01C 21/16* (2013.01); *H04N 17/002* (2013.01); *H04N 5/23254* (2013.01); *H04N 5/23258* (2013.01)

(58) Field of Classification Search
None
See application file for complete search history.

(56) References Cited

U.S. PATENT DOCUMENTS 7,796,872 B2 * 9/2010 Sachs et al. ............... 396/55
2004/0252200 A1 * 12/2004 Thomas ................. 348/208.4
2008/0317379 A1 * 12/2008 Steinberg et al. ........... 382/275
2011/0090303 A1    4/2011 Wu et al.
2011/0304694 A1   12/2011 Nestares et al.

FOREIGN PATENT DOCUMENTS

| EP | 1071285 A1 | 1/2001 |
| EP | 2117227 A2 | 11/2009 |
| GB | 2481098 A  | 12/2011 |

OTHER PUBLICATIONS

International Search Report and Written Opinion—PCT/US2013/045015—ISA/EPO—Sep. 12, 2013.

* cited by examiner

*Primary Examiner* — Dave Czekaj
*Assistant Examiner* — Nam Pham
(74) *Attorney, Agent, or Firm* — Silicon Valley Patent Group LLP

(57) ABSTRACT

A mobile device compensates for a lack of a time stamp when an image frame is captured by estimating the frame time stamp latency. The mobile device captures images frames and time stamps each frame after the frame time stamp latency. A vision based rotation is determined from a pair of frames. A plurality of inertia based rotations is measured using time stamped signals from an inertial sensor in the mobile device based on different possible delays between time stamping each frame and time stamps on the signals from the inertial sensors. The determined rotations may be about the camera's optical axis. The vision based rotation is compared to the plurality of inertia based rotations to determine an estimated frame time stamp latency, which is used to correct the frame time stamp latency when time stamping subsequently captured frames. A median latency determined using different frame pairs may be used.

30 Claims, 5 Drawing Sheets

ADAPTIVE ESTIMATION OF FRAME TIME STAMP LATENCY

BACKGROUND

1. Background Field

Embodiments of the subject matter described herein are related generally to image processing, and more particularly compensating for the lack of a time stamp when images are captured.

2. Relevant Background

Computer vision based tracking methods suffer from a lack of robustness when there are quick motions and, in particular, when there are large image displacements caused by the rotation of the camera. Hence, aiding computer vision tracking with inertial sensors can drastically improve the tracking robustness. Sensor fusion between poses derived from camera frames and inertial sensor measurements can only occur if accurate time stamps for camera frames and inertial sensor measurements are available.

In current mobile device platforms, the application program interface (API) for inertial sensors includes a time stamp field and the inertial sensor data is time stamped when the sensor is sampled. Unfortunately, many current mobile devices do not have a time stamp field in the camera API. Accordingly, in such mobile devices, image frames are not time stamped at the sensor level when captured by the camera, but are time stamped at a later time, e.g., when delivered to an application level, such as at a High Level Operating System (HLOS) or other level. In addition, sensor measurements are often low pass filtered to suppress noise. Sometimes, the low pass filtering is aggressive, effectively averaging measurements over more than one sample and thereby rendering the sensor time stamp inaccurate. Thus, fusion between poses derived from camera frames and inertial sensor measurements is inaccurate.

SUMMARY

A mobile device compensates for a lack of a time stamp when an image frame is captured by estimating the frame time stamp latency. The mobile device captures images frames and time stamps each frame after the frame time stamp latency. A vision based rotation is determined from a pair of frames. A plurality of inertia based rotations is measured using time stamped signals from an inertial sensor in the mobile device based on different possible delays between time stamping each frame and time stamps on the signals from the inertial sensors. The determined rotations may be about the camera's optical axis. The vision based rotation is compared to the plurality of inertia based rotations to determine an estimated frame time stamp latency, which is used to correct the frame time stamp latency when time stamping subsequently captured frames. A median latency determined using different frame pairs may be used.

In one implementation, a method includes capturing frames with a camera in a mobile device; time stamping each frame after a frame time stamp latency from when the frame is captured by the camera; determining a vision based rotation of the camera using a pair of frames; measuring a plurality of inertia based rotations using signals from an inertial sensor in the mobile device, wherein the signals are time stamped when produced by the inertial sensor and the plurality of inertia based rotations are based on different possible delays between time stamping each frame and time stamps on the signals from the inertial sensor; comparing the vision based rotation to the plurality of inertia based rotations to determine an estimated frame time stamp latency; and using the estimated frame time stamp latency to correct the frame time stamp latency in subsequently captured frames.

In one implementation, a mobile device includes a camera; an inertial sensor; and a processor coupled to receive frames captured by the camera and coupled to sample signals from the inertial sensor, wherein the frames are time stamped after a frame time stamp latency from when the frame is captured by the camera and the signals from the inertial sensor are time stamped when produced by the inertial sensor, the processor configured to determine a vision based rotation of the camera using a pair of frames, measure a plurality of inertia based rotations using the signals sampled from the inertial sensor, the plurality of inertia based rotations being based on different possible delays between each frame being time stamped and time stamps on the signals from the inertial sensor, compare the vision based rotation to the plurality of inertia based rotations to determine an estimated frame time stamp latency, and use the estimated frame time stamp latency to correct the frame time stamp latency in subsequently captured frames.

In one implementation a mobile device includes means for capturing frames with a camera in a mobile device; means for time stamping each frame after a frame time stamp latency from when the frame is captured by the camera; means for determining a vision based rotation of the camera using a pair of frames; means for measuring a plurality of inertia based rotations using signals from an inertial sensor in the mobile device, wherein the signals are time stamped when produced by the inertial sensor and the plurality of inertia based rotations are based on different possible delays between time stamping each frame and time stamps on the signals from the inertial sensor; means for comparing the vision based rotation to the plurality of inertia based rotations to determine an estimated frame time stamp latency; and means for using the estimated frame time stamp latency to correct the frame time stamp latency in subsequently captured frames.

In one implementation a non-transitory computer-readable medium including program code stored thereon, includes program code to determine a vision based rotation of a camera using a pair of frames captured by the camera, wherein each frame is time stamped after a frame time stamp latency from when the frame is captured by the camera; program code to measure a plurality of inertia based rotations using signals sample from an inertial sensor, wherein the signals are time stamped when produced by the inertial sensor and the plurality of inertia based rotations are based on different possible delays between time stamping each frame and time stamps on the signals from the inertial sensor; program code to compare the vision based rotation to the plurality of inertia based rotations to determine an estimated frame time stamp latency; and program code to use the estimated frame time stamp latency to correct the frame time stamp latency in subsequently captured frames.

DETAILED DESCRIPTION

Figure 1:
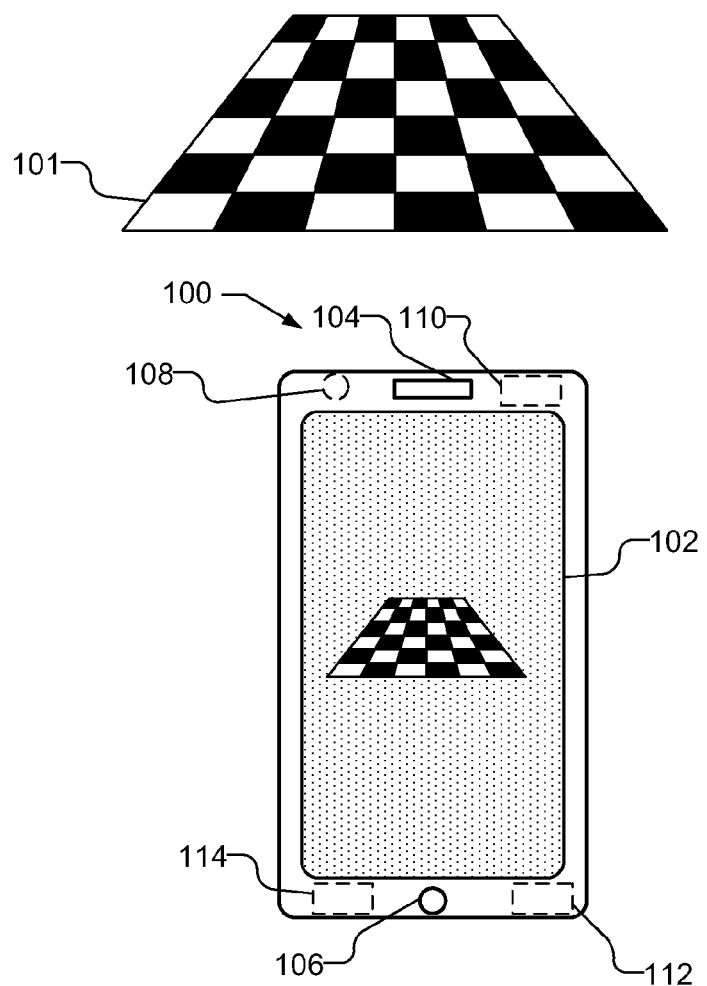
FIG. 1 illustrates a mobile device capable compensating for lack of a time stamp when the image frame is captured.

FIG. 1 illustrates a mobile device 100 capable of compensating for lack of a time stamp when the image frame is captured. The mobile device 100 time stamps the frame after a frame time stamp latency from when the frame has been captured by the camera. For example, a captured frame is not time stamped at the sensor level, e.g., by the camera when captured, but is time stamped later, e.g., when the frame reaches an application level, which may be the High Level Operating System (HLOS), which may be, e.g., Android, iOS, etc, or other level. The frame time stamp latency may be a function of the type of mobile device 100 as well as the camera frame rate, which depends on frame rate which depends on lighting conditions. The mobile device 100 estimates the frame time stamp latency based on a vision based rotation and inertial sensor based rotation, and uses the estimated frame time stamp latency to correct the frame time stamp latency in subsequently captured images.

As used herein, a mobile device refers to any portable electronic device such as a cellular or other wireless communication device, personal communication system (PCS) device, personal navigation device (PND), Personal Information Manager (PIM), Personal Digital Assistant (PDA), or other suitable mobile device including wireless communication devices, computers, laptops, tablet computers, etc. that are capable of capturing images of the environment, which may be used in vision-based tracking The mobile device may be capable of receiving wireless communication and/or navigation signals, such as navigation positioning signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND.

The mobile device 100 includes a display 102, which may be a touch screen display. The mobile device 100 includes a forward facing camera 108 to image the environment such as a target 101, which is illustrated as being shown on display 102. The images or frames produced by the camera 108 are used by vision pose module 112 to generate a computer vision based pose. It should be understood that the camera 108 may capture images and/or frames of video, and that the terms image and frame are used interchangeably herein. The mobile device 100 also includes inertial sensors 110, such as accelerometers, gyroscopes or the like, which may be used to assist in determining the pose of the mobile device 100. The output of the inertial sensors 110 is used by an inertial sensory system (INS) 114 to generate an INS pose. The output of the inertial sensors 110 are time stamped when the sensor is sampled. The mobile device 100, however, does not time stamp a frame captured by the camera 108 until the frame reaches the HLOS.

The mobile device 100 may also include other features that are not relevant to the present disclosure, such as a speaker 104 and microphone 106, e.g., if the mobile device 100 is a cellular telephone.

Figure 2A:
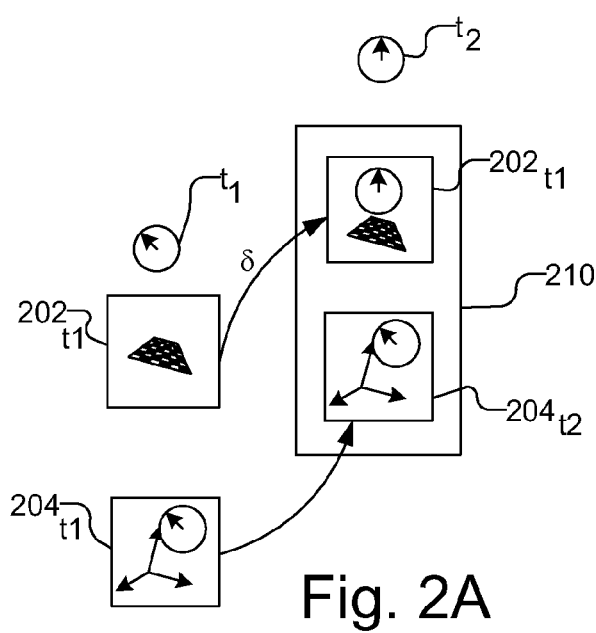
FIGS. 2A, 2B, 2C, and 2D schematically illustrate the latency in the time stamp for a frame of video and the correction of the latency.
Figure 2B:
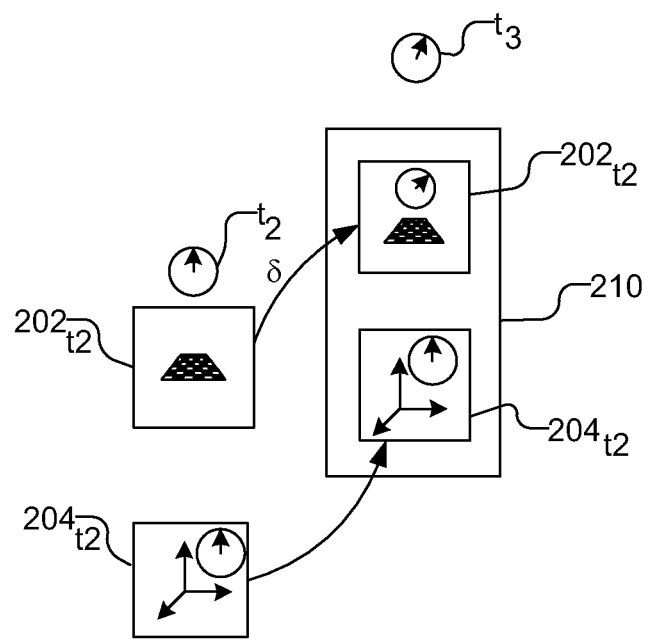
Figure 2C:
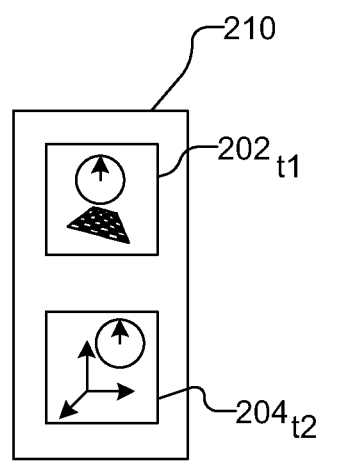
Figure 2D:
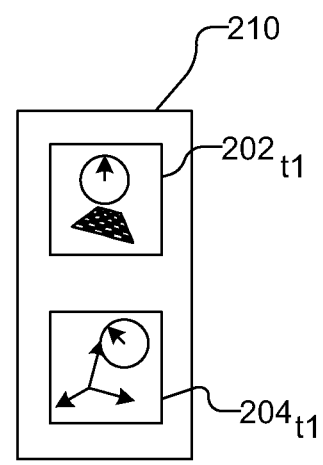

FIGS. 2A, 2B, 2C, and 2D schematically illustrate the latency in the time stamp for a frame of video or image and the correction of the latency. FIG. 2A shows that at time $t_1$, an image frame $202_{t1}$ is captured by the camera 108 and that the output $204_{t1}$ of the inertial sensor 110 is sampled. As illustrated by the clock symbol superimposed on the output $204_{t1}$, the outputs $204_{t1}$ of the inertial sensor 110 is time stamped when it is sampled, but the captured frame $202_{t1}$ is not time stamped. The image frame $202_{t1}$ and the output $204_{t1}$ are independently provided to the HLOS 210. As illustrated by the clock symbol, the image frame $202_{t1}$ is time stamped when it reaches the HLOS 210. However, due to the delay between the frame being captured taken and the frame reaching HLOS, referred to herein at latency δ, the image frame $202_{t1}$ is time stamped at time $t_2$. The output $204_{t1}$ of the inertial sensor 110, however, retains its time stamp from time $t_1$. As illustrated in FIG. 2B, an image frame $202_{t2}$ captured at time $t_2$ and an output $204_{t2}$ sampled from inertial sensor at time $t_2$ are similarly uploaded to the HLOS 210, resulting in the image frame $202_{t2}$ being time stamped at time $t_3$. FIG. 2C illustrates the HLOS 210 aligning the image frame and the output based on their time stamps, resulting in the image frame $202_{t1}$, which was actually captured at time $t_1$, being aligned with the output $204_{t2}$, which was actually sampled from the inertial sensor 110 at time $t_2$. Thus, the mobile device 100 estimates the latency δ and corrects the time stamps accordingly. For example, as illustrated in FIG. 2D, the application reduces the time stamps on the image frames by the latency δ, resulting in the HLOS 210 aligning the image frame $202_{t1}$ with the output $204_a$.

Figure 3:
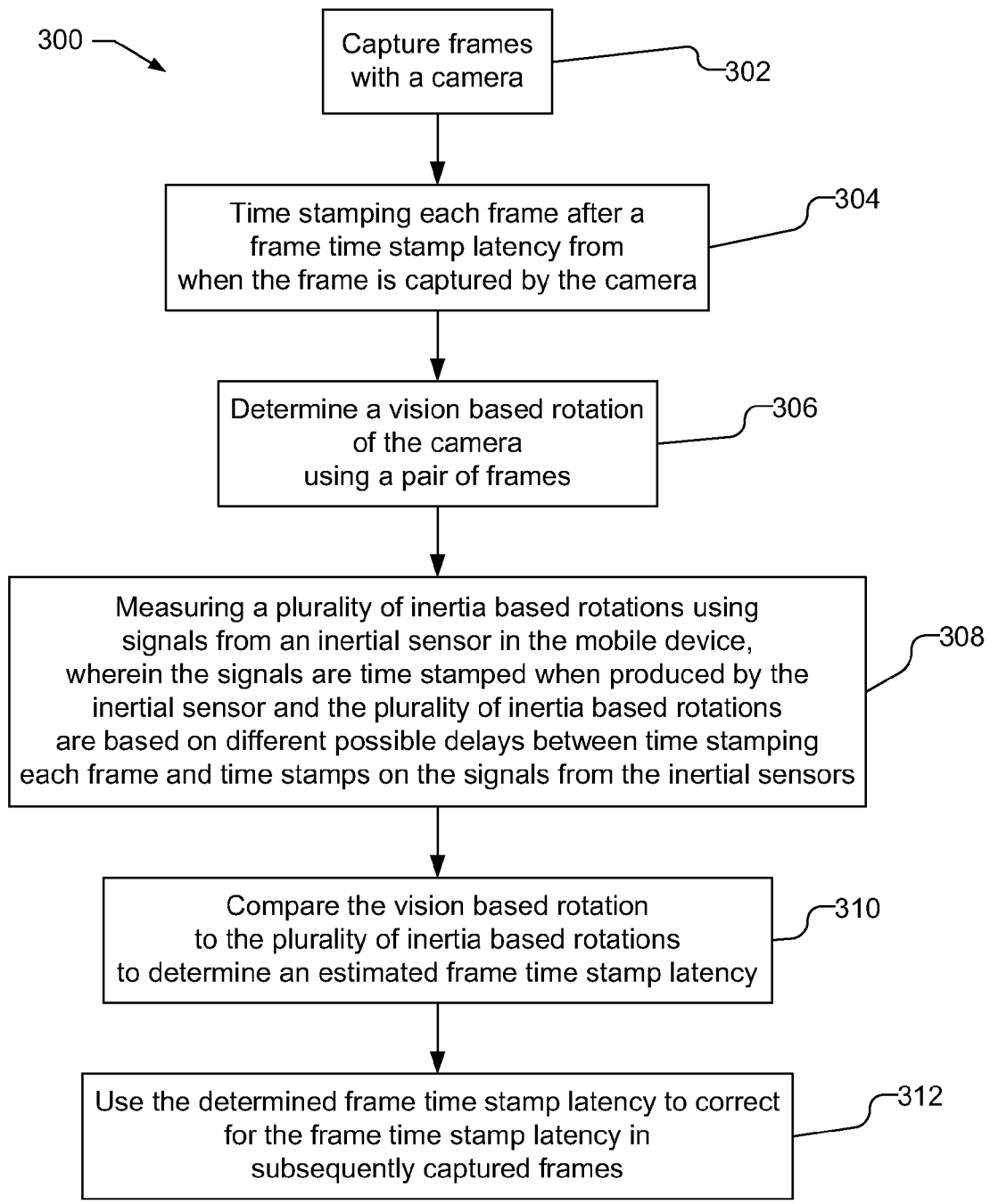
FIG. 3 is a flow chart illustrating a process of estimating the frame time stamp latency.

FIG. 3 is a flow chart 300 illustrating a process of estimating the frame time stamp latency. Frames are captured from a camera in a mobile device (302), e.g., as frames of multiple images or frames in a video stream from camera 108. Each frame is time stamped after a frame time stamp latency from when the frame is captured by the camera (304). Thus, the captured frames are not time stamped at the sensor level, i.e., camera level, but are time stamped after a latency period, when the frame arrives at an application level. For example, the frame may be time stamped when the frame arrives at the HLOS, which may be, e.g., Android, iOS, etc. It should be understood that the time stamp may be applied at any level after the frame is captured by the camera, such as at the interface between camera driver and camera HAL (Hardware Abstraction Level), which passes the image up to application level, as the time stamp will still incur a delay associated with VFE (Video Front End) processing. A vision based rotation of the camera is determined using a pair of frames (306). For example, a computer vision based pose of the camera may be determined from each frame and the rotation of the camera between the two frames is determined from the poses. Generating a vision based pose using captured frames is well known in the art.

A plurality of inertia based rotations is measured using signals from an inertial sensor in the mobile device, wherein the signals are time stamped when produced by the inertial sensor and the plurality of inertia based rotations are based on different possible delays between time stamping each frame and time stamps on the signals from the inertial sensors (308). The inertial sensors used to provide the plurality of inertia based rotations may be, e.g., one or more gyroscopes and or accelerometers. In some implementations, the vision based rotation and the plurality of inertia based rotations may be determined as only the rotation around the around the optical axis of the camera, sometimes referred to as the z axis. Using the rotation around the z axis is advantageous as computer vision pose estimates are more accurate around the z axis and quick converge even in bad lighting conditions. The vision based rotation is compared to the plurality of inertia based rotations to determine an estimated frame time stamp latency (310). The estimated frame time stamp latency is used to correct for the frame time stamp latency in subsequently captured frames (312).

Figure 4:
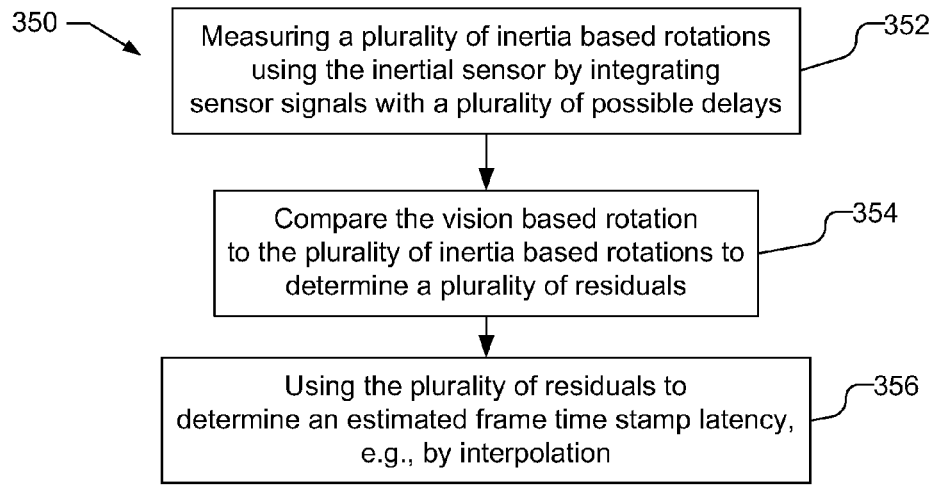
FIG. 4 is a flow chart further illustrating the method of determining multiple rotations from the inertial sensor, which are compared to the rotation determined from the pair of frames to determine the frame time stamp latency

FIG. 4 is a flow chart 350 further illustrating the method of determining the plurality of inertia based rotations (308) and comparing the vision based rotation to the inertia based rotation to determine an estimated frame time stamp latency (310). As illustrated in FIG. 4, inertia based rotations are measured using the inertial sensor by integrating the inertia sensor signals between the times stamped on each frame shifted with a plurality of possible delays (352). Thus, for each inertia based rotation, signals from the inertial sensor are integrated from a start time to an end time, which corresponds to the time stamps for the pair of frames shifted by a delay. Different delays are used to shift the start and stop times for the integration, thereby producing a plurality of measured inertia based rotations. For example, six possible delays may be used from 0 ms to 125 ms in 25 ms steps. The resulting plurality of inertia based rotations is compared to the vision based rotation to generate a plurality of residuals (354), where a residual is, e.g., the difference between the vision based rotation and an inertia based rotation. By way of example, if the latency in the system is 25 ms, the residual for an inertia based rotation having a delay of 25 ms would be zero, or approximately zero due to noise. Thus, when six possible delays are used, six residuals will be produced for the pair of frames. The residuals are used to determine the estimated frame time stamp latency (356), e.g., by interpolation. For example, coefficients of a third order polynomial are estimated based on the plurality of residuals and the minimum of the third order polynomial (in the range of 0 ms to 125 ms) is calculated to estimate the frame time stamp latency.

Figure 5:
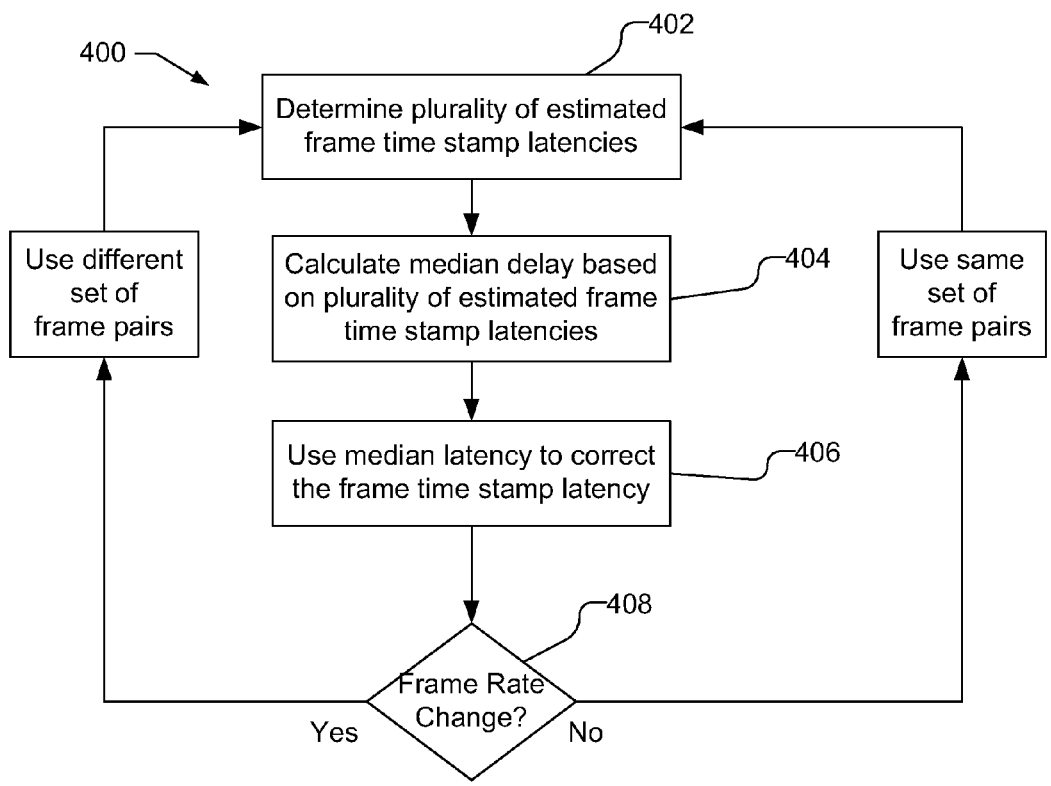
FIG. 5 is a flow chart illustrating using a plurality of frame pairs to estimate the frame time stamp latency.

Additionally, the frame time stamp latency may be estimated using a plurality of frame pairs. FIG. 5 is a flow chart 400 illustrating using a plurality of frame pairs to estimate the frame time stamp latency. A plurality of estimated frame time stamp latencies is determined (402), wherein each estimated frame time stamp latency is determined for a different pair of frames. To improve the convergence speed, only pairs of consecutive frames for which poses have been computed with high inlier count, i.e., above a desired threshold, may be used to determine the estimated frame time stamp latencies. The use of frame pairs with poses having high inlier counts ensures that the poses are accurate. A median of the plurality of estimated frame time stamp latencies is calculated (404), which is advantageous as it removes outliers. The median may be determined using an array, e.g., with 125 entries from 0 ms to 124 ms. The estimated frame time stamp latency for each pair of frames is rounded to the nearest millisecond and the respective entry in the array is incremented. The median can then be determined easily from the array, while requiring only a limited amount of memory to store the estimated frame time stamp latencies. The median latency can then be used to correct the frame time stamp latency when time stamping subsequently captured frames (406).

Additionally, the frame rate of the camera changes as a function of lighting conditions and the frame time stamp latency is a function of the frame rate. Accordingly, as illustrated in FIG. 5, a change in the frame rate (408) causes a separate instantiation of the process. For example, if no change in frame rate is detected (408), the process continues using the same set of frame pairs (410). If however, a frame rate change is detected (408), a different set of frame pairs is used (412) and the process is repeated. It should be understood that if desired, the determination of an estimated frame time stamp latency for a particular frame rate may use data from a previous instantiation of the process at that frame rate. For example, if the frame rate starts at 30 fps, then drops to 15 fps, and goes back to 30 fps, the frame time stamp latency estimation need not start over, but may continue where it left off at the 30 fps frame rate.

The determination of a frame rate change (408) may be based on a comparison of the time differences between frame pairs. For example, a first time difference may be generated by comparing corrected frame time stamps from a first pair of frames and a second time difference may be generated by comparing corrected frame time stamps from a second pair of frames. The first time difference and the second time difference may be compared to determine if the frame rate has changed. A new frame rate is detected if time differences are greater than a threshold. If desired, the difference between time stamps on frame pairs may be computed and rounded. For example, the difference between a current and last frame time stamp may be computed and rounded as 0-10 ms->0, 10-20 ms->1, etc. Rounding and filtering is useful as the time stamping of the frames at the HLOS has a constant delay due to VFE processing and a variable delay due to application processor load, where only the constant delay is being removed. If desired, the detection of a frame rate change may require two or more time delay estimates that yield a consistent and different frame rate than the frame rate assumed previously.

Figure 6:
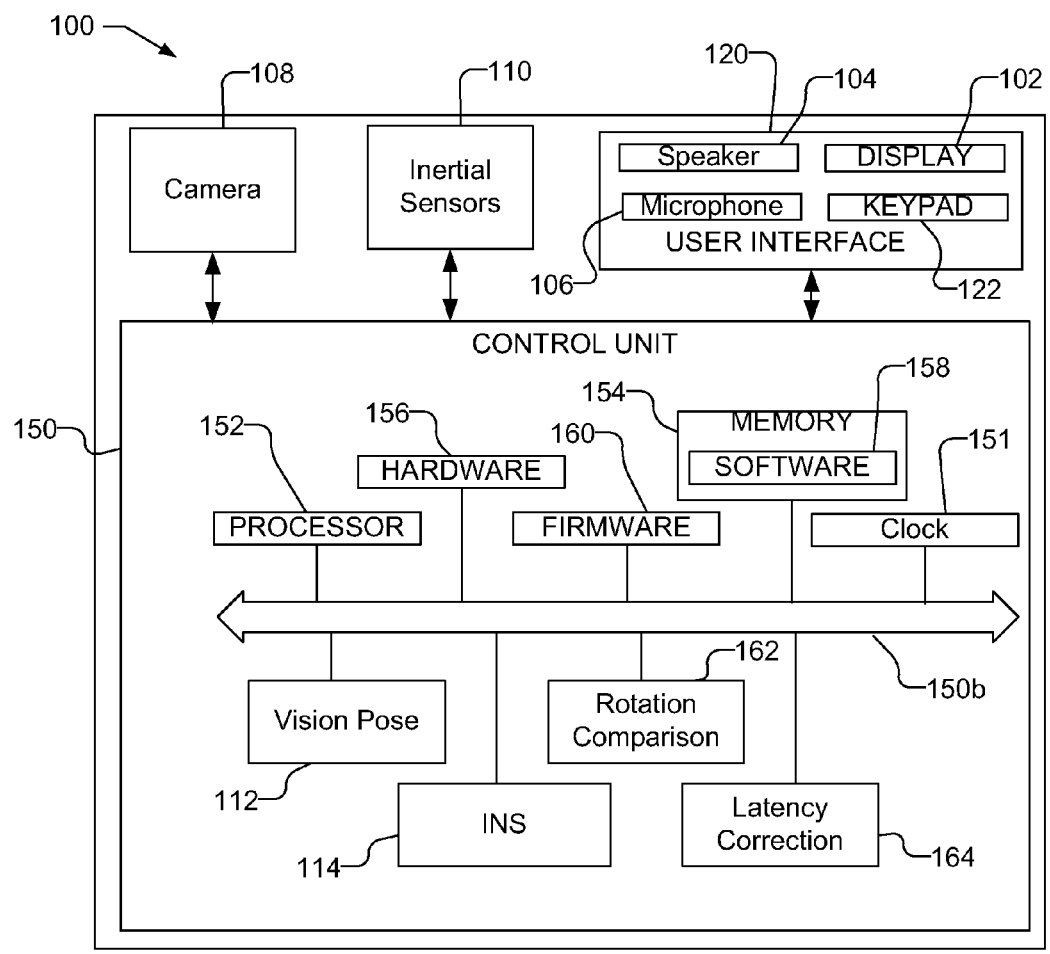
FIG. 6 is a block diagram of the mobile device that compensates for a lack of a time stamp when the image frame is captured using the described process.

FIG. 6 is a block diagram of the mobile device 100 that compensates for a lack of a time stamp when the image frame is captured using the described process. The mobile device 100 includes the camera 108, which does not time stamp images when captured, and inertial sensors 110, which do time stamp signals when sampled. The inertial sensors 110 may be, e.g., accelerometers, gyroscopes or the like. The mobile device may include a user interface 120 that includes the display 102 and a keypad 122 or other input device through which the user can input information into the mobile device 100. The user interface 120 may also include the speaker 104 and microphone 106, e.g., when the mobile device is a cellular telephone or the like. Of course, the mobile device 100 may include other elements unrelated to the present disclosure.

The mobile device 100 also includes a control unit 150 that is connected to and communicates with the camera 108 and inertial sensors 110. The control unit 150 may be provided by a bus 150b, a clock 151 that is used to time stamp the signals from the inertial sensor 110 when sampled and to time stamp images when received at the HLOS in control unit 150. The control unit 150 includes a processor 152 and associated memory 154, and may include hardware 156, software 158, and firmware 160. The control unit 150 may include a vision pose module 112, which may be used to determine the rotation between frames captured by the camera, and an INS module 114, which may be used to determine rotations based on signals from the inertial sensors 110. The control unit 150 may further include a rotation comparison module 162 that compares the rotations determined by the vision pose module 112 and INS module 114 to determine an estimated frame time stamp latency. A latency correction module 164 corrects the frame time stamp latency of subsequently captured frames using the determined estimated frame time stamp latency.

The various processing units, e.g., vision pose module 112, INS module 114, rotation comparison module 162, and latency correction module 164, are illustrated separately from processor 152 for clarity, but may be part of the processor 152 or implemented in the processor based on instructions in the software 158 which is run in the processor 152. It will be understood as used herein that the processor 152, and/or the various processing units, can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile device, and is not to be limited to any particular type of memory or number of memories, or type of media upon which memory is stored.

The methodologies described herein may be implemented by various means depending upon the application. For example, these methodologies may be implemented in hardware 156, firmware 160, software 158, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 154 and executed by the processor 152. Memory may be implemented within or external to the processor 152. If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In one implementation, the mobile device includes a means for capturing frames of images or video, which may be, e.g., the camera 108, and a means for time stamping each frame after a frame time stamp latency from when the frame is captured by the camera, which may be the clock 151 and processor 152. The mobile device may further include a means for determining a vision based rotation of the camera using a pair of frames, which may be the vision pose module 112 or processor 152. A means for measuring a plurality of inertia based rotations using signals from an inertial sensor in the mobile device, wherein the signals are time stamped when produced by the inertial sensor and the plurality of inertia based rotations are based on different possible delays between time stamping each frame and time stamps on the signals from the inertial sensors may be the INS module 114 or processor 152. A means for comparing the vision based rotation to the plurality of inertia based rotations to determine an estimated frame time stamp latency may be, e.g., rotation comparison module 162 or processor 152. A means for using the estimated frame time stamp latency to correct the frame time stamp latency in subsequently captured frames may be the latency correction module 164 or the processor 152. Additionally, the mobile device may include a means for determining a plurality of estimated frame time stamp latencies, wherein each estimated frame time stamp latency in the plurality of estimated frame time stamp latencies is determined for a different pair of frames, which may be, e.g., the vision pose module 112, INS module 114 and rotation comparison module 162 as well as the processor 152. A means for calculating a median latency of the plurality of estimated frame time stamp latencies may be, e.g., the rotation comparison module 162 or processor 152, as well as memory 154, which stores an array of latencies as described above. The mobile device may further include a means for determining if a frame rate for the camera changes, which may be the latency correction module 164 or processor 152. A means for determining a new plurality of estimated frame time stamp latencies for pairs of frames captured after a frame rate change may be, e.g., the vision pose module 112, INS module 114 and rotation comparison module 162 as well as the processor 152. A means for calculating a new median of the new plurality of estimated frame time stamp latencies may be, e.g., the rotation comparison module 162 or processor 152, as well as memory 154, which stores an array of latencies as described above.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
   capturing frames with a camera in a mobile device;
   time stamping each frame after a latency period from when the frame is captured by the camera;
   determining a vision based rotation of the camera using a pair of frames;
   measuring a plurality of inertia based rotations using signals from an inertial sensor in the mobile device, wherein the signals are time stamped when produced by the inertial sensor and wherein measuring the plurality of inertia based rotations comprises integrating signals from the inertial sensor between start and stop times that correspond to times time stamped on each frame in the pair of frames and that are shifted with different delays;
   determining an estimate of the latency period based on differences between the vision based rotation and each of the plurality of inertia based rotations; and
   using the estimate of the latency period to correct for the latency period in time stamping of subsequently captured frames.

2. The method of claim 1, wherein the vision based rotation is determined and the plurality of inertia based rotations is measured about a single axis normal to a lens of the camera.

3. The method of claim 1, wherein:
   determining the estimate of the latency period based on the differences between the vision based rotation and each of the plurality of inertia based rotations comprises:

comparing each of the plurality of inertia based rotations to the vision based rotation to generate a plurality of residuals;
using the plurality of residuals to determine the estimate of the latency period.

4. The method of claim 3, wherein using the plurality of residuals to determine the estimate of the latency period comprises interpolating the plurality of residuals to determine the estimate of the latency period.

5. The method of claim 1, further comprising:
determining a plurality of estimates of the latency period, wherein each estimate of the latency period in the plurality of estimates of the latency period is determined for a different pair of frames; and
calculating a median latency for the plurality of estimates of the latency period;
wherein using the estimate of the latency period to correct for the latency period in time stamping of subsequently captured frames comprises using the median latency to correct for the latency period in time stamping of subsequently captured frames.

6. The method of claim 5, further comprising determining an accuracy of poses generated by each frame in the different pair of frames, wherein determining the plurality of estimates of the latency period uses only pairs for frames with the accuracy greater than a threshold.

7. The method of claim 5, further comprising:
determining if a frame rate for the camera changes; and
determining a new plurality of estimates of the latency period for pairs of frames captured after a frame rate change;
calculating a new median latency for the new plurality of estimates of the latency period; and
using the new median latency to correct for the latency period in time stamping of subsequently captured frames.

8. The method of claim 7, wherein determining if the frame rate for the camera changes comprises:
generating a first time difference by comparing frame time stamps from a first pair of frames;
generating a second time difference by comparing frame time stamps from a second pair of frames;
comparing the first time difference and the second time difference to determine if the frame rate has changed.

9. The method of claim 8, wherein the first time difference and the second time difference are rounded prior to being compared.

10. The method of claim 1, wherein the inertial sensor comprises a gyroscope.

11. A mobile device comprising:
a camera;
an inertial sensor; and
a processor coupled to receive frames captured by the camera and coupled to sample signals from the inertial sensor, wherein the frames are time stamped after a latency period from when the frame is captured by the camera and the signals from the inertial sensor are time stamped when produced by the inertial sensor, the processor configured to determine a vision based rotation of the camera using a pair of frames, measure a plurality of inertia based rotations using the signals sampled from the inertial sensor, wherein the plurality of inertia based rotations being measured by integrating signals from the inertial sensor between start and stop times that correspond to times time stamped on each frame in the pair of frames and that are shifted with different delays, determine an estimate of the latency period based on differences between the vision based rotation and each of the plurality of inertia based rotations, and use the estimate of the latency period to correct for the latency period in time stamping of subsequently captured frames.

12. The mobile device of claim 11, wherein the vision based rotation is determined and the plurality of inertia based rotations is measured about a single axis normal to a lens of the camera.

13. The mobile device of claim 11, wherein the processor is configured to determine the estimate of the latency period based on the differences between the vision based rotation and each of the plurality of inertia based rotations by being configured to compare each of the plurality of inertia based rotations to the vision based rotation to generate a plurality of residuals, and to use the plurality of residuals to determine the estimate of the latency period.

14. The mobile device of claim 13, wherein the processor is configured to use the plurality of residuals to determine the estimate of the latency period by being configured to interpolate the plurality of residuals to determine the estimate of the latency period.

15. The mobile device of claim 11, wherein the processor is further configured to determine a plurality of estimates of the latency period, wherein each estimate of the latency period in the plurality of estimates of the latency period is determined for a different pair of frames, and calculate a median latency for the plurality of estimates of the latency period, wherein the processor is configured to use the median latency to correct the latency period in subsequently captured frames.

16. The mobile device of claim 15, wherein the processor is further configured to determine an accuracy of poses generated by each frame in the different pair of frames, wherein the processor determines the plurality of estimates of the latency period with only pairs for frames with the accuracy greater than a threshold.

17. The mobile device of claim 15, wherein the processor is further configured to determine if a frame rate for the camera changes, determine a new plurality of estimates of the latency period for pairs of frames captured after a frame rate change, calculate a new median latency for the new plurality of estimates of the latency period; and use the new median latency to correct the latency period in subsequently captured frames.

18. The mobile device of claim 17, wherein the processor is configured to determine if the frame rate for the camera changes by being configured to generate a first time difference by comparing frame time stamps from a first pair of frames, generate a second time difference by comparing frame time stamps from a second pair of frames, and compare the first time difference and the second time difference to determine if the frame rate has changed.

19. The mobile device of claim 18, wherein the processor is configured to round the first time difference and the second time difference prior to comparing the first time difference and the second time difference.

20. The mobile device of claim 11, wherein the inertial sensor comprises a gyroscope.

21. A mobile device comprising:
means for capturing frames of images or video;
means for time stamping each frame after a latency period from when the frame is captured;
means for determining a vision based rotation using a pair of frames;
means for measuring a plurality of inertia based rotations using signals from an inertial sensor in the mobile device, wherein the signals are time stamped when produced by the inertial sensor and wherein measuring the plurality of inertia based rotations comprises integrating signals from the inertial sensor between start and stop times that correspond to times time stamped on each frame in the pair of frames and that are shifted with different delays;

means for determining an estimate of the latency period based on differences between the vision based rotation and each of the plurality of inertia based rotations; and means for using the estimate of the latency period to correct for the latency period in subsequently captured frames.

22. The mobile device of claim 21, wherein the vision based rotation is determined and the plurality of inertia based rotations is measured about a single axis normal to a lens of the means for capturing frames.

23. The mobile device of claim 21, wherein the means for determining the estimate of the latency period based on the differences between the vision based rotation and each of the plurality of inertia based rotations compares each of the plurality of inertia based rotations to the vision based rotation to generate a plurality of residuals, and uses the plurality of residuals to determine the estimate of the latency period.

24. The mobile device of claim 21, further comprising:

means for determining a plurality of estimates of the latency period, wherein each estimate of the latency period in the plurality of estimates of the latency period is determined for a different pair of frames; and means for calculating a median latency of the plurality of estimates of the latency period;

wherein the means for using the estimate of the latency period to correct the latency period uses the median latency.

25. The mobile device of claim 24, further comprising:

means for determining if a frame rate changes; and means for determining a new plurality of estimates of the latency period for pairs of frames captured after a frame rate change;

means for calculating a new median of the new plurality of estimates of the latency period; and wherein the means for using the estimate of the latency period to correct the latency period uses the new median.

26. A non-transitory computer-readable medium including program code stored thereon, comprising:

program code to determine a vision based rotation of a camera using a pair of frames captured by the camera, wherein each frame is time stamped after a latency period from when the frame is captured by the camera;

program code to measure a plurality of inertia based rotations using signals sample from an inertial sensor, wherein the signals are time stamped when produced by the inertial sensor and the plurality of inertia based rotations are measured by integrating signals from the inertial sensor between start and stop times that correspond to times time stamped on each frame in the pair of frames and that are shifted with different delays;

program code to determine an estimate of the latency period based on differences between the vision based rotation and each of the plurality of inertia based rotations; and program code to use the estimate of the latency period to correct the latency period in subsequently captured frames.

27. The non-transitory computer-readable medium of claim 26, wherein the vision based rotation is determined and the plurality of inertia based rotations is measured about a single axis normal to a lens of the camera.

28. The non-transitory computer-readable medium of claim 26, wherein:

the program code to determine the estimate of the latency period based on the differences between the vision based rotation and each of the plurality of inertia based rotations comprises:

program code to compare each of the plurality of inertia based rotations to the vision based rotation to generate a plurality of residuals;

program code to use the plurality of residuals to determine the estimate of the latency period.

29. The non-transitory computer-readable medium of claim 26, further comprising:

program code to determine a plurality of estimates of the latency period, wherein each estimate of the latency period in the plurality of estimates of the latency period is determined for a different pair of frames; and program code to calculate a median latency of the plurality of estimates of the latency period;

wherein the median latency is used to correct the latency period in subsequently captured frames.

30. The non-transitory computer-readable medium of claim 29, further comprising:

program code to determine if a frame rate for the camera changes; and program code to determine a new plurality of estimates of the latency period for pairs of frames captured after a frame rate change;

program code to calculate a new median of the new plurality of estimates of the latency period; and wherein the new median is used to correct the latency period in subsequently captured frames.

* * * * *